(No Model.)
R. M. HUNTER.
METHOD OF AND APPARATUS FOR THE TRANSMISSION OF ELECTRICAL ENERGY.
No. 503,321. Patented Aug. 15, 1893.
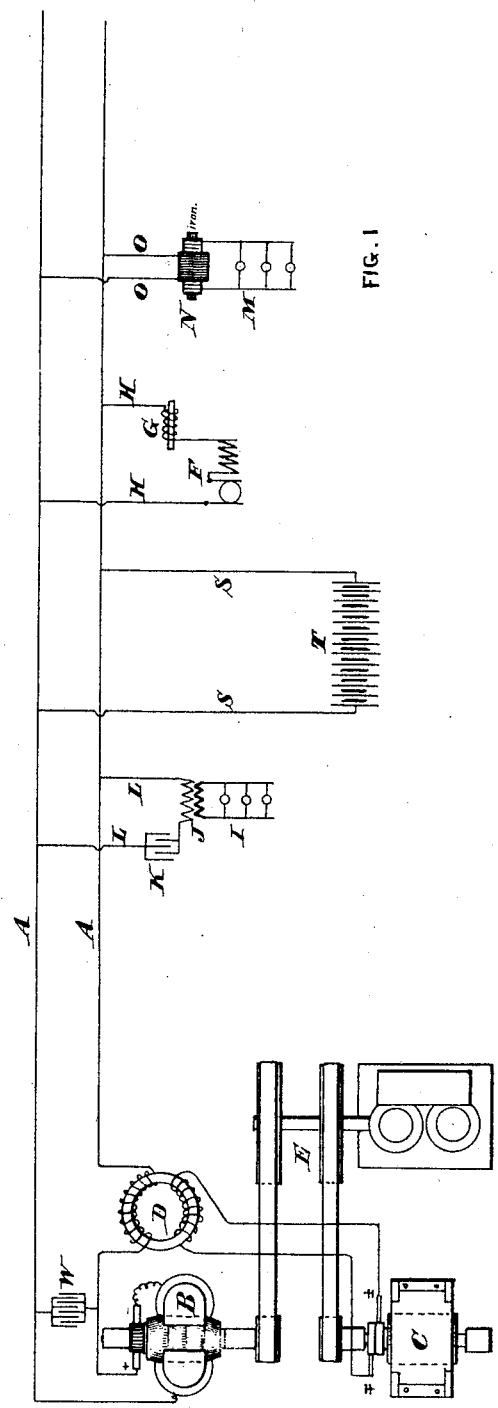
FIG. 1
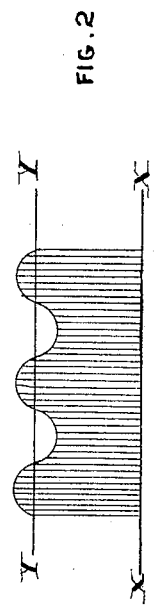
FIG. 2
Attest
C. M. Dieterich.
H. L. Motherwell.
Inventor

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

METHOD OF AND APPARATUS FOR THE TRANSMISSION OF ELECTRICAL ENERGY.

SPECIFICATION forming part of Letters Patent No. 503,321, dated August 15, 1893.

Application filed November 21, 1892. Serial No. 452,662. (No model.)

*To all whom it may concern:*

Be it known that I, RUDOLPH M. HUNTER, of the city and county of Philadelphia, and State of Pennsylvania, have invented an Improvement in Methods of and Apparatus for the Transmission of Electrical Energy, of which the following is a specification.

My invention has reference to methods of and apparatus for the transmission of electrical energy, and consists of certain improvements which are fully set forth in the following specification and shown in the accompanying drawings which form a part thereof.

This application, (Case No. 235,) has particular relation to a system of transmission of electrical energy contemplating the use of undulatory currents as distinguished from continuous uniform or alternating currents. By the employment of a current of this nature, it is possible to operate translating or current consuming devices which cannot be practically operated by the usual alternating current, and furthermore, a current of the nature herein referred to has the advantage of alternating currents, in that it may be generated at a high tension and thereby easily transmitted over long distances and by small conductors and utilized by means of transformers for operating translating or current consuming devices requiring currents of lower tension.

In carrying out my invention, I employ a high tension continuous current generator directly connected to the line circuit, and in connection therewith, I also employ an alternating current generator indirectly connected to the line circuit through a transformer or induction device for varying the line current without having direct connection with it. The line circuit leads to distant places and supplies current to suitable current consuming or translating devices of any of the well known types.

Referring to the drawings: Figure 1 is a diagram illustrating my improved system for the transmission of electrical energy; and Fig. 2 illustrates the nature of the current in the line circuit.

A is the line circuit and may be a complete metallic circuit, or the earth may be utilized as the return circuit.

B is a high tension continuous current generator and directly connected to the line A. C is an alternating current generator of any suitable type and is connected with one coil of a transformer D of any suitable construction, the other coil of which is preferably in the line circuit A. The two machines B and C should be driven at fixed rates of speed and preferably by a common prime mover E so that their potentials may always remain relatively the same. In the most desirable operation of my improvement, the potential of the continuous current should be considerably greater than the potential in the alternating induced current, and the machines B and C and converter D should be so proportioned as to produce these desired results. The current from the continuous current generator B may be taken as having a potential between the lines X—X and Y—Y of Fig. 2, and the induced current produced by the alternating current machine C and transformer D may be taken as the wave line upon Y—Y, the positive and negative potentials being the extent of the curve above and below the line Y—Y. The induced current is therefore impressed upon the current from the continuous current generator, and the superimposing of the one upon the other results in the production of a current all of one sign and having a potential corresponding to the shaded portion of Fig. 2, which is greater at some places than the potential of the continuous current generator, but less at other places. The mean potential of the current in the line A, A is that of the machine B except in cases where the alternating machine induces such alternations in the line as to cause the wave or curved line to pass below the line X—X in which case we would have an alternating current having a much greater positive potential than the negative. The alternating current generator has no direct connection with the line A, A. There is no material interference with the operation of the generator B, and as the transformer D does not form any material obstruction due to self induction to the continuous currents passing from the generator B, we have in this system a construction in which both machines perform their desired functions without in the least being able to interfere with the other.

I have shown several translating devices as examples though others may be employed. F is a series electric motor in a local circuit H connected with the mains A and containing a self induction or choking coil G. By this means the continuous current passes through the motor and operates it while the induced alternating portions thereof are choked off and do not interfere with the proper running in the motor. N is a transformer or converter of any well known type having its fine wire in circuit with the line A by circuit O, and having its coarse wire connected with a local circuit M having lamps or other current consuming devices. J is a similar transformer having its fine wire connected with the line A by a circuit L containing a condenser K or other suitable induction apparatus adapted to form a space in the circuit L. The coarse wire of the transformer J connects with a local circuit I containing a translating or current consuming device of any suitable kind. The continuous current in this case cannot pass the condenser, and the induced current is produced wholly by the alternating current in the line. T is a secondary battery in a local circuit S connected with the line. This battery may be charged by the currents in the line without the interposition of a choking coil, as the self induction between the several plates is sufficient to arrest the alternating current while allowing the continuous current to pass through and perform its charging effect.

If desired and to avoid any fluctuation in the current passing through the continuous current generator B, I may employ a condenser W in a shunt circuit around the continuous current generator, which while not permitting the passage of the direct current, will permit the passage of induced alternating current impulses due to the transformer D. This may or may not be employed as desired.

I do not confine myself to any particular arrangements of circuits or construction of the several machines other than that applied in the foregoing specification.

What I claim, and desire to secure by Letters Patent, is—

1. In a system for electrical transmission of energy, the combination of a line circuit, a continuous current generator connected directly to the line circuit, an alternating current generator, and a transformer having one of its coils in circuit with the line and its other coil in circuit with the alternating current generator.

2. In a system for electrical transmission of energy the combination of a line circuit, a continuous current generator connected directly to the line circuit, an alternating current generator, a transformer having one of its coils in circuit with the line and its other coil in circuit with the alternating current generator, a local circuit connecting with the line, an electric motor in said circuit and a choking coil or self induction device also in said local circuit.

3. In a system for electrical transmission of energy, the combination of a line circuit, a continuous current generator connected directly to the line circuit, an alternating current generator, a transformer having one of its coils in circuit with the line and its other coil in circuit with the alternating current generator, and a distantly located transformer having its fine wire coil connected with the line through a condenser and having its coarse wire coil connected with a local circuit containing a current consuming device.

4. In a system for electrical transmission of energy, a line circuit, a continuous current generator directly connected with the line, a transformer having one of its coils in the direct circuit with the line, an alternating current generator connected with the other coil of the transformer, and a power device for maintaining proper relative speeds to the continuous and alternating current generators.

5. In a system for electrical transmission of energy, a line circuit, in combination with a high tension continuous current generator directly connected with the line, an alternating current generator, a converter or transformer having one of its coils connected in the line circuit and the other of its coils connected with the alternating current generator, and suitable translating devices connecting with the line circuit at a distant place, the two generator machines being so proportioned that the induced current generated by the alternating current generator and transformer shall have a less potential than the potential of the current generated by the continuous current generator.

6. The herein described method for the transmission of electrical energy which consists in generating and supplying to a line circuit a continuous current of high potential, generating alternating currents of uniform periods, and by induction generating induced currents of the same period as the alternating current but of lower potential than the potential of the continuous current in the line circuit and causing the same to flow over the line, whereby the current traversing the line shall be undulatory.

7. The herein described method for the transmission of electrical energy which consists in generating and supplying to a line circuit a continuous current of high potential, generating alternating currents of uniform periods, and by induction inducing thereby currents of the same period but of lower potential than the current in the line circuit, whereby the current traversing the line circuit shall be undulatory and of higher potential than the potential of the continuous current and shall be wholly external to the alternating current generator circuit.

8. The herein described method for the transmission of electrical energy which consists in generating and supplying to a line circuit a continuous current of high potential, generating alternating currents of uniform periods, and by induction inducing thereby currents of lower potential in the line circuit, whereby the current traversing the line circuit shall be uniform and undulatory, and maintaining the relative relations between the continuous and alternating induced potentials.

9. The herein described method for the transmission of electrical energy which consists in supplying to a line circuit a continuous current of high potential, causing said current to flow through one coil of a transformer, generating alternating currents of uniform periods and causing them to flow through the other coil of the transformer whereby the alternating currents so generated shall not be directly impressed upon the continuous current flowing in the line but the direct continuous and induced alternating current resulting and passing through the line shall be undulatory and uniform in its character.

In testimony of which invention I have hereunto set my hand.

R. M. HUNTER.

Witnesses:
ERNEST HOWARD HUNTER,
H. L. MOTHERWELL.